US006717607B1

(12) United States Patent
Lauper et al.

(10) Patent No.: US 6,717,607 B1
(45) Date of Patent: Apr. 6, 2004

(54) METHOD AND SYSTEM FOR VIDEO CONFERENCES

(75) Inventors: Eric Lauper, Bern (CH); Beat Herrmann, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/069,518

(22) PCT Filed: Apr. 28, 2000

(86) PCT No.: PCT/CH00/00236

§ 371 (c)(1),
(2), (4) Date: Mar. 5, 2002

(87) PCT Pub. No.: WO01/84838

PCT Pub. Date: Nov. 8, 2001

(51) Int. Cl.[7] .................................................. H04N 7/14
(52) U.S. Cl. .............................. 348/14.08; 348/14.09; 348/14.13
(58) Field of Search .......................... 348/14.01–14.09, 348/14.1, 14.11, 14.13; 370/260; 709/204; 345/753; H04N 7/14

(56) References Cited

U.S. PATENT DOCUMENTS 5,500,671 A   3/1996  Andersson et al.
5,703,637 A  12/1997  Miyazaki et al.

FOREIGN PATENT DOCUMENTS

EP    0 865 207       9/1998
JP    357208781 A  * 12/1982  ............ H04N/7/14
JP    409009230 A  *  1/1997  ............ H04N/7/15
WO    99 12351       3/1999

* cited by examiner

Primary Examiner—Melur Ramakrishnaiah
(74) Attorney, Agent, or Firm—Oblon, Spivak, McClelland, Maier & Neustadt, P.C.

(57) ABSTRACT

Method and system for video conferencing with at least three different video conference participant stations, which communicate with one another by a telecommunications network. Multimedia data is transmitted over the telecommunications network including at least participant image data and/or participant audio data, and each participant receives the participant image data of the other participants shown at the same time visually arranged on a reproduction device. An eye tracking system registers the direction of view of the respective participant and transmits it to a communications unit. Those participant image data which are not shown in the momentary direction of view of the respective participant are transmitted over the telecommunications network to the communications unit with reduced resolution and/or video transmission rate.

14 Claims, 3 Drawing Sheets

METHOD AND SYSTEM FOR VIDEO CONFERENCES

BACKGROUND OF THE INVENTION

Field of the Invention

This invention relates to a method and a system for video conferences with at least three different video conference participant stations which communicate with one another, multimedia data being transmitted via a telecommunications network, which data comprise at least participant image data and/or participant audio data, and each participant receiving the participant image data of the other participants shown at the same time visually arranged on a reproduction device, e.g. a display or a VRD (Virtual Retinal Display). The invention relates in particular to methods and systems which communicate over telecommunications networks consisting at least partially of a mobile radio network.

Known is the rapid transmission, receipt and display of video images through video and television apparatus. The pictures usually have a resolution of at least 10×6 ppi (pixels per inch) in sufficiently good color and gray scale quality. A prerequisite for the transmission of the entire picture information is a minimal bandwidth for the transmission channel of several megahertz. The costs for such systems, however, are much too high for certain applications such as video conference systems for business and private use. Using media with smaller bandwidth, such as e.g. public telecommunications networks, for the transmission of video pictures is known. The transmission rate is correspondingly low for these media, however. For special applications, such as "slow scan" video systems, such a limited bandwidth can actually be sufficient. Examples therefor are security and surveillance systems in which a high picture repetition rate or high resolution is not necessary. Such systems typically use a resolution of 128×128 pixels for the whole picture, only 16 color or gray scale values being used. Video pictures of higher quality, e.g. with 640×480 pixels (European standard: 620×576 pixels, 8 bit depth of color) and a depth of color of 64 levels, as are common for video conferences, cannot be transmitted with these systems, however. A normal video picture requires about 2 million bits of information, i.e. about 250 kbytes, for gray scale pictures. With color pictures the quantity of data rises to even 750 kbytes. The data transmission rate over public switched telephone networks (PSTN) today is typically at about 57 000 bps (bits per second—for digital data this corresponds to bauds) per line in the analog area and 64 000 bps for ISDN, whereby about 30 seconds or respectively 90 seconds are needed to transmit a complete video picture of sufficiently good quality. This is by far too slow for most video conference applications. For this reason the unprocessed digital video data are compressed with the most various data compression algorithms in order to shorten the transmission time. However very good compression and decompression algorithms with a compression rate of 1/20 to 1/50 are also insufficient for many video conference applications. Moreover compression and decompression is normally time-consuming and requires corresponding energy and calculating capacity. For instance, in the field of mobile radio, it is precisely this last factor which can be decisive. It is thereby to be taken into consideration that in the field of mobile radio, in contrast to that of PSTN networks, the connection quality that allows a maximal transmission rate is not always present. Furthermore, with transmission rates lower than the maximum possible the transmission time is multiplied correspondingly. To obtain a further data compression, there are several documents in the state of the art is which propose transmitting with high resolution only a certain detail of a captured picture while all other picture sections are transmitted with low resolution. The patent publications U.S. Pat. No. 5,703,637 and U.S. Pat. No. 4,513,317 are examples which register with an eye tracking system the movement of the eyeball or of the retina, and use this information to show only a small region of the picture with high resolution. These systems make use of the feature of the human eye which is that only a small part of the retina (called fovea) is of high resolution, while the large remaining part has low resolution. The state of the art has several drawbacks, however, inter alia the disadvantage that all participants have to use the same video standard to be able to show these pictures. It is desirable, however, for video conference systems to be independent of the video standard. Moreover the fovea has a high resolution visual angle of only 2°. This fact is corrected by the brain through a natural but unavoidable and continuous scanning movement of the eye. The result of this is that, regardless of how good the visual angle and the high resolution picture section coincide, the picture appears blurry to the user with a small sharp picture detail in the center of vision. With the present state of the art this drawback can only be corrected with great effort, if at all.

SUMMARY OF THE INVENTION

It is an object of this invention to propose a new method and system for video conferences which does not have the drawbacks described above. In particular, the participant image data of video conferences should be able to be transmitted with high compression.

This object is achieved according to the present invention through the elements of the independent claims. Further preferred embodiments follow moreover from the dependent claims and from the description.

In particular, these objects are achieved through the invention in that at least three participants communicate with one another via video conference participant stations of a video conference system, multimedia data being transmitted over a telecommunications network, which data comprise at least participant image data and/or participant audio data, and each of the participants receiving the participant image data of the other participants shown at the same time visually arranged on a reproduction device, e.g. a display, of the respective video conference participant station, in that the direction of view of the participants is registered in each case by an eye tracking system and eye tracking data comprising at least data about the direction of view are transmitted to a communications unit of the respective video conference participant station, and in that transmitted in each case with full resolution and video transmission rate over the telecommunications network to the communications unit of a video conference participation station are the participant image data of that participant whose participant image data are shown on the reproduction device of this last-mentioned video conference participant station in the momentary direction of view of the participant of this video conference participant station while the participant image data of the other participants are transmitted in reduced resolution and/or at reduced video transmission rate. The invention has the advantage that the compression, i.e. the reduction, of the participant image data is independent of the video standard used since the participant image data of a participant are transmitted either reduced or in full resolution without a complicated subdivision into sub-frames taking place therefor as in the state of the art. The individual video images of a video conference interface can thereby be maintained, for example. The simplicity of the method also brings with it a minimal use of calculation capacity, which can be especially important for mobile radio devices having limited energy reserves. The drawback of the state of the art that the scanning movement of the fovea has to be corrected (such as e.g. U.S. Pat. No. 4,513,317) is eliminated with this invention since the scanning movement in the normal case relates to the object to be discerned. The impression of a sharp focus with blurry surroundings is eliminated. The entire logistical object, e.g. the video conference participant, is sharply discerned. If the glance wanders to the next logistical unit, i.e. the participant image data for another participant, these are perceived sharply as a whole.

In an embodiment variant, the video transmission rate for these participant image data that are not shown in the momentary direction of view of the participant, is set at zero. This embodiment variant has in particular the advantage that the network load is limited to a minimum. At the same time the to necessary calculating capacity needed e.g. to compress the participant image data is mimimized.

In a further embodiment variant, the eye tracking data as well as the participant image data are transmitted to a central unit, the central unit determining for each participant, according to the indications of the eye tracking data of the respective participant, the resolution and/or the video transmission rate of the participant image data of the other participants and transmitting the participant image data to the communications unit of the respective participant in this resolution and/or at this video transmission rate. This embodiment variant has the advantage inter alia that with a larger number of participants the network load remains small. Through the central reduction of the participant image data, the calculating capacity of the individual video conference participant stations likewise remains small, for example, compared to other solutions.

In a further embodiment variant, the participant image data are transmitted to a central unit and are stored in a data store of the central unit (the storing or buffering of the data can be achieved e.g. via a data buffer, a data stream, a database or in another way). The communications unit of a participant determines, according to the indications of the eye tracking data of the respective participant, the resolution and/or video transmission rate of the participant image data of the other participants, and these participant image data are transmitted by the central unit to the communications unit of the respective participant in this resolution and/or at this video transmission rate. This embodiment variant has the same advantages as the previous embodiment variant, but does not require from the central unit any calculating capacity for calculation of the video images to be shown of the individual participants since the communications units access directly the participant image data in the resolution and at the video transmission rate they have determined. Another advantage is that the eye tracking data do not have to be transmitted over the network.

In an embodiment variant, the participant image data for a participant are stored in each case in a data store of the communications unit of this participant, and the communications unit determines according to the indications of the eye tracking data of this participant the resolution and/or the video transmission rate of the participant image data of the other participants, the last-mentioned participant image data being transmitted by the communications units of the other participants in this resolution and/or at this video transmission rate to the communications unit of the respective participant. This embodiment variant has the advantage inter alia that it manages without a central unit. Subscribers of the telecommunications network can join together directly over the telecommunications network without having to make use of further units outside their video conference participant stations.

In a further embodiment variant, at least one video conference participant station is connected to the telecommunications network via a mobile radio network. The telecommunications network can comprise, for example, a fixed network such as a LAN (Local Area Network) or WAN (Wide Area Network), the public switched telephone network (PSTN) and/or ISDN (Integrated Services Digital Network), the Internet or another communications network, in particular a mobile radio network.

In another embodiment variant, the communications unit uses image analysis and form reconstruction algorithms to portray the participant image data that have been transmitted with reduced resolution. One of the advantages of this embodiment variant is that, despite reduced resolution of the transmitted pictures, the pictures can be reproduced again through the pictorial synthesis of the form reconstruction algorithms and can be shown in higher resolution than that transmitted.

It should be stressed here that, in addition to the inventive method, the present invention also relates to a system for carrying out this method.

BRIEF DESCRIPTION OF THE DRAWINGS

Embodiment variants of the present invention will be described in the following with reference to examples. The examples of the embodiments are illustrated by the following attached figures.

DETAILED DESCRIPTION OF THE INVENTION

Figure 1:
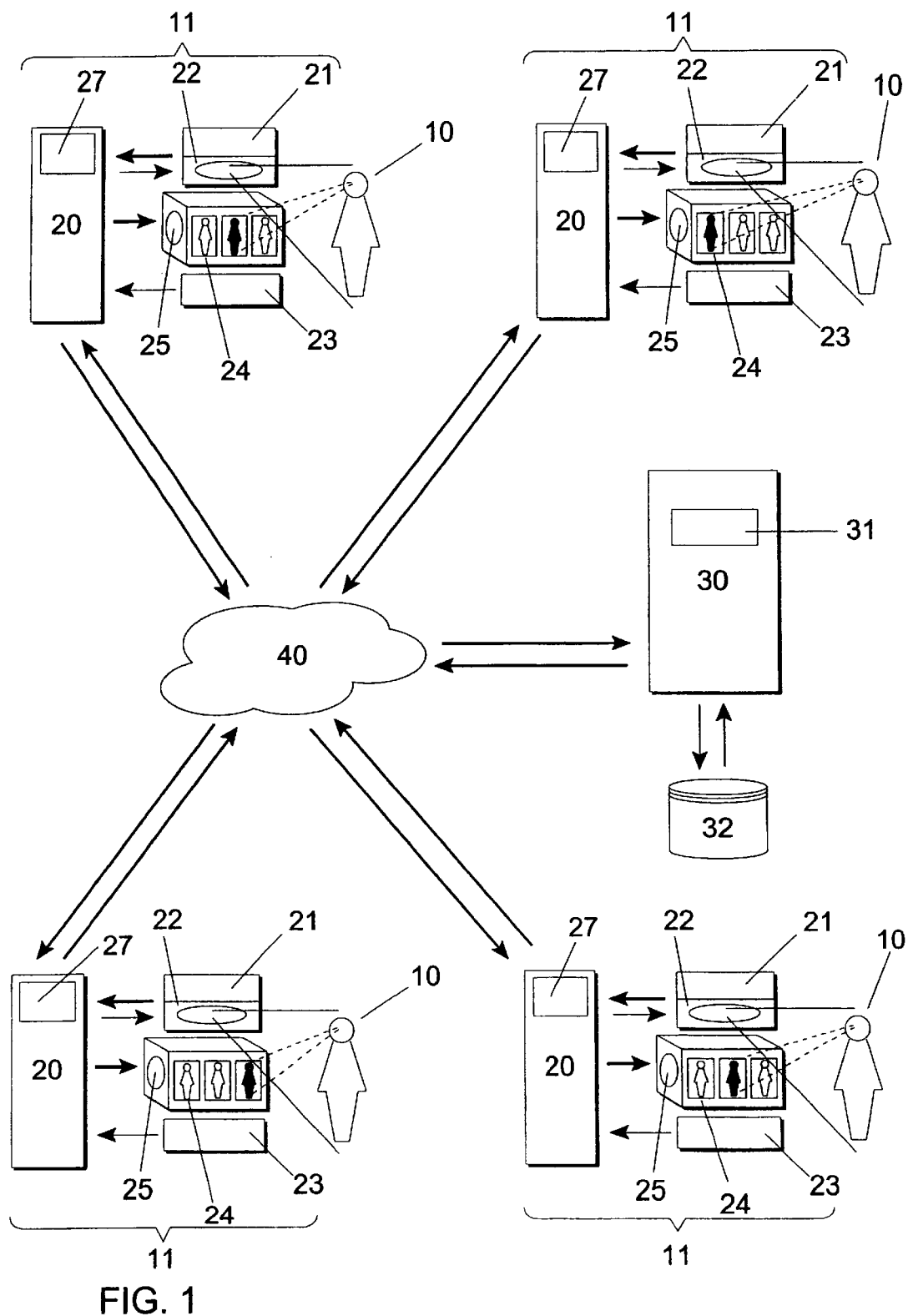
FIG. 1 shows a block diagram which illustrates schematically an embodiment variant of a video conference system in which communications units 20 of video conference participant stations access participant image data and participant audio data via a central unit 30.

FIG. 1 illustrates an architecture which can be used for achieving the invention. In this embodiment example, at least three different video conference participant stations 11 communicate with one another, multimedia data comprising at least participant image data 22 and/or participant audio data 21 being transmitted over a telecommunications network 40, and each of the participants 10 receiving the participant image data of the other participants shown at the same time visually arranged on a reproduction device 24 of the respective video conference participant station 11. The reproduction device 24 can be a display or a VRD (Visual Retinal Display), for example. The telecommunications network 40 can comprise, for example, a fixed network such as a LAN (Local Area Network) or WAN (Wide Area Network), the public switched telephone network (PSTN and/or ISDN, Integrated Services Digital Network), the Internet, a packet-oriented communications network or another communications network, in particular a mobile radio network. The mobile radio network can be e.g. a GSM, a UMTS or another mobile radio network. The communication over the mobile radio network 40 takes place, for instance, via protocols such as GPRS (Generalized Packet Radio Service), WAP (Wireless Application Protocol) or UMTS (Universal Mobile Telecommunication System). The capturing of participant image data takes place over an image data input module 22, and the capturing of the participant audio data takes place over an audio data input module 21. The image data input module 22 can comprise e.g. a video camera, a scanning unit, for instance based on MEMS (Microelectromechanical System), or a digital camera. Video pictures, texts, tables, slides, graphics, etc., can be examples of participant image data. The audio data input module 21 can comprise e.g. one or more microphones, CD-ROM players or other sound input devices. An eye tracking system 23 registers the direction of view of the respective participant 10, and transmits eye tracking data, containing at least data on the direction of view, to a communications unit 20 of the respective video conference participant station 11 (i.e. the video conference participant station of the respective participant). The eye tracking system 23 can e.g. comprise a Purkinje picture-based system which determines the direction of view of the participant 10 via the reflection differences between two parallel light beams reflected on the ocular fundus and on the cornea, or e.g. it can comprise a system based on a laser scanner that scans the ocular fundus via a laser beam and a reference beam, and thus determines the direction of view of the participant 10, or another system for determining the direction of view of the participant 10 such as e.g. an eye tracking system according to the patent publication WO 94/09472. Participant image data and participant audio data are transmitted by the communications unit 20 to a central unit 30. The transmission can take place e.g. compressed and/or encrypted. The central unit 30 has a coding module 31 which receives and decompresses and/or decrypts the data. Used for the compression can be the most various algorithms of the state of the art such as e.g. Huffman coding, 3:2 Pulldown, etc. as well as compression standards such as e.g. MPEG (Moving Pictures Expert Group) of the International Organization for Standardization (ISO). In the transmission of data from the central unit 30 to a communications unit 20, the coding module 31 also undertakes the compression and/or the encryption of the data for the transmission. The communications units 20 likewise have a coding module 26, which undertakes the compression/decompression as well as the encryption/decryption of the data. For example, a video camera of the image data input module 22 generates an analog video signal. The coding switch 279 is set by the communications unit 20 such that the data flow is conducted via the compression and encryption system 271. The input processor 273 receives the video signal, e.g. a PAL signal with 25 fps (frames per second) or a NTSC signal with 29.97 fps, and digitalizes as well as filters the analog video signal in order to generate the unprocessed digital video signal. With e.g. digital image data capturing, the last step is omitted. The 25 frames of the PAL signal correspond to 50 fields, i.e. 50 fields per second, while the 29.97 frames of the NTSC signal correspond to 59.94 fields, i.e. 59.94 fields per second. The video data analyzer 274 receives the digital video signal from the input processor 273, which is accompanied, for instance, by a VSync signal, a field synchronization signal, and generates a modified video signal for the compression module 275. The modification of the signal takes place in real time, and generates an output signal which is then able to be optimally compressed. Among other things, the video data analyzer 274 removes redundant fields, for instance, or frames in the video signal, and generates the necessary information for e.g. Motion Compensated Prediction or Discrete Cosine Transformation as is also used in the MPEG format, for example. If picture analysis and form reconstruction algorithms are used, these can likewise be executed by the video data analyzer. Belonging thereto are in particular face analysis and synthesis techniques, such as e.g. Feature Point Modeling. So-called feature points are thereby defined from a predetermined, as general as possible model (e.g. of the face), the vector of these feature points describing the form of the model, the trajectory describing the movement of the model, and the vector space of these vectors describing the possibilities of motion of the model. The shaping of the originally general model can be calculated e.g. with DFFD methods (Dirichlet Free Form Deformation). The facial synthesis as well as the facial animation can be implemented according to the MPEG-4 standard, for example. The modified digital video data are finally compressed by the compression module 275, and, if necessary, encrypted. The compressed digital video signal is transmitted by the communications unit 20 over the telecommunications network 40. The coding module 27 of the communications unit 20 can likewise be used for decrypting and decoding of data that have been transmitted over the telecommunications network 40 to the communications unit 20. The coding switch 279 is set by the communications unit 20 in this case such that the functions of the decompression and decryption system 272 are active. The decoding module 276 receives the video data from the communications unit 20, decompresses it, and, if necessary, decrypts it. If form reconstruction algorithms are used, an output processor 277 carries out the picture synthesis, calculates the video image to be shown, and forwards it as video signal to a reproduction module 278, e.g. a visual display card or a VRD display device (Visual Retinal Display), e.g. a VRD display device according to the patent publication WO 94/09472. The data transfer of the participant image data which are supposed to be transmitted is initiated and carried out e.g. via a transfer module implemented by means of software or hardware, of the central unit 30 or of the communications units 20. The participant image data and the participant audio data are stored in the central unit in a data store 32. The buffering or storing of the data can be achieved via a data stream, a data buffer, a database or in another way. Transmitted in each case with full resolution and video transmission rate over the telecommunications network 40 to the communications unit 20 of a video conference participation station 11 are the participant image data of that participant whose participant image data are shown on the reproduction device 24 of this last-mentioned video conference participant station 11 in the momentary direction of view of the participant 10 (i.e. of the participant whose direction of view has been registered by the eye tracking system of the video conference participant station) while the participant image data of the remaining participants are transmitted in reduced resolution and/or at reduced video transmission rate. In the embodiment example of FIG. 1, the communications units 20 transmit the participant image data of their participants 10 to a central unit 30, where they are stored in a data store 32 of the central unit 30. There exists e.g. the possibility of transmitting at the same time the eye tracking data of the respective communications units 20. The eye tracking data can be e.g. direction indications for the direction of view, indications about the participant image data shown in the direction of view, etc. In this case, the central unit 30 determines for each participant 10, according to the indications of the eye tracking data with respect to the direction of view of the respective participant 10, the resolution and/or the video transmission rate of the participant image data of the other participants, and transmits the data in this resolution and/or at this video transmission rate to the communications units 20 of the respective participant 10. The coding module 31 of the central unit 30 also carries out the reduction of the resolution of the participant image data. The reduction of the multimedia data does not necessarily have to be restricted to the participant image data, but can also concern other multimedia image data <sic. multimedia data> of the channel selected with the direction of view, for instance the participant audio data (e.g. with MP3 standard). Another possibility is that the eye tracking data are not transmitted by the communications units 20 to the central unit 30, but only the participant image data are. The central unit 30 stores the participant image data in full and reduced resolution in a data store 32. The communications units 20 can then, in accordance with their eye tracking data, access in the central unit 30 the participant image data of the other participants 10 in the corresponding resolution and/or at the corresponding video transmission rate. The requested participant image data are transmitted by the central unit 30 to the respective communications unit 20 via the telecommunications network 40.

Figure 2:
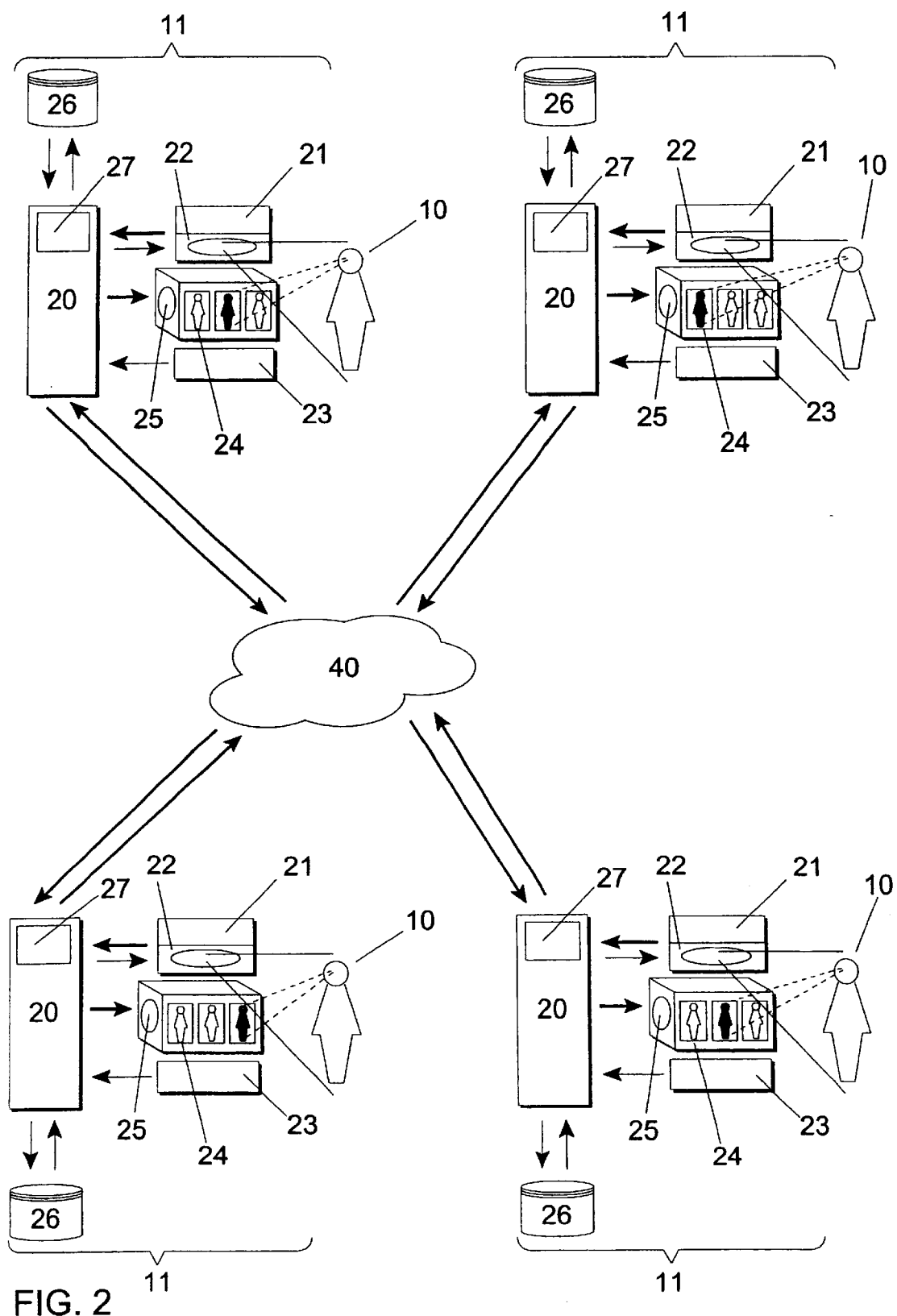
FIG. 2 shows a block diagram which illustrates schematically a further embodiment variant of a video conference system in which communications units 20 of video conference participant stations access participant image data and participant audio data via data stores 26 of the other communications units 20.
Figure 3:
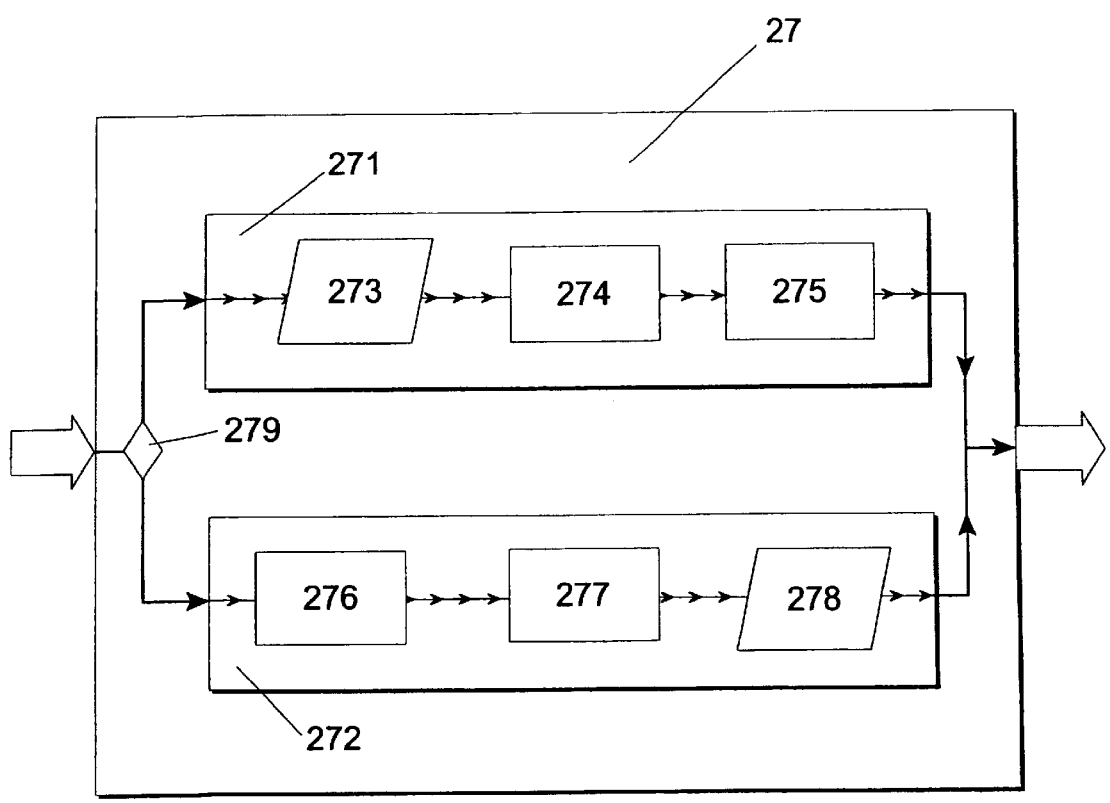
FIG. 3 shows a flow chart which illustrates schematically the steps for an embodiment variant of a coding module 27, which coding module 27 comprises inter alia the compression and decompression functions as well as the encryption and decryption functions.

FIG. 2 illustrates an architecture which can be used to achieve the invention. In this embodiment example, at least three different video conference participant stations 11 communicate with one another via a video conference system, multimedia data being transmitted over a telecommunications network 40, which data comprise at least participant image data 22 and/or participant audio data 21, and each of the participants 10 receiving the participant image data of the other participants shown at the same time visually arranged on a reproduction device 23 of the respective video conference participant station 11. The reproduction device 24 can be, for instance, a display or a VRD (Visual Retinal Display). As in the embodiment example above, the telecommunications network 40 can comprise a fixed network such as a LAN (Local Area Network) or WAN (Wide Area Network), the public switched telephone network (PSTN and/or ISDN, Integrated Services Digital Network), the Internet or another communications network, in particular a mobile radio network. The capturing of the participant image data takes place over an image data input module 22, and the capturing of the participant audio data takes place over an audio data input module 21. The image data input module 22 can comprise e.g. a video camera, a scanning unit, or a digital camera. Video pictures, texts, tables, slides, graphics, etc., can be examples of participant image data. The audio data input module 21 can comprise e.g. one or more microphones, CD-ROM players or other sound input devices. An eye tracking system 23 registers the direction of view of the respective participant 10, and transmits eye tracking data, containing at least data on the direction of view, to a communications unit 20 of the respective video conference participant station 11. Eye tracking systems as in the previous embodiment example can be used, for instance. Transmitted in each case with full resolution and video transmission rate over the telecommunications network 40 to the communications unit 20 of a video conference participation station 11 are the participant image data of that participant whose participant image data are shown on the reproduction device 24 of this last-mentioned video conference participant station 11 in the momentary direction of view of the participant 10 (i.e. of the participant whose direction of view has been registered by the eye tracking system of the video conference participant station), while the participant image data of the other participants are transmitted in reduced resolution and/or at reduced video transmission rate. The reduction of the multimedia data does not necessarily have to be restricted to the participant image data, but can also concern other multimedia image data <sic. multimedia data> of the channel selected with the direction of view, for instance the participant audio data (e.g. with MP3 standard). Participant image data and participant audio data are not transmitted to a central unit 30 in this embodiment example, however, but are stored in a data store 26 of the respective communications unit 20. The buffering or storing of the data can be achieved via a data stream, a data buffer, a database or in another way. The communications unit 20 determines, based on the indications of the eye tracking data with respect to the direction of view of the respective participant 10, the resolution and/or the video transmission rates of the participant image data to be shown on the reproduction device 24, and requests these participant image data at the communications units of the other participants. The requested participant image data are transmitted by the communications units 20 of the other participants in this resolution and/or at this video transmission rate to the communications unit of the respective participant 10. The embodiment example has a coding module 27 with the same functionality as in the preceding embodiment example. Thus, e.g. compression/decompression, encryption/decryption and/or picture synthesis with form reconstruction algorithms are implemented in the coding module 27 as described above. The coding module 27 likewise undertakes e.g. the conversion of the analog video data into digital video data and vice-versa, if necessary.

In both embodiment examples it is possible for the video transmission rate to be set at zero for those participant image data which are not shown on the reproduction device 24 in the direction of view of the participant 10. The participant then receives on the reproduction device 24 only the momentarily viewed participant image data in a moving way whereas the rest are shown e.g. as still picture. The still picture can comprise, for example, those participant image data which were transmitted the last time they were situated on the reproduction device 24 in the momentary direction of view of the participant 10. There also exists the possibility, however, of showing as the still picture e.g. any other picture data instead of the aforementioned, for instance simple synthetic reproductions of the participant image data. Another possibility for the participant image data (both that transmitted with full resolution and that transmitted with reduced resolution) is that the movement of the objects of the participant image data, i.e. the mouth movement, for instance, of a participant, is shown completely synthetically, i.e. through form reconstruction and animation algorithms. It then suffices, for example, to transmit only one picture of a participant and to simulate the movement. In an embodiment variant it is also conceivable, for instance, to vary the video transmission rate through Motion Compensation Prediction. Thus, for example, the video transmission rate is increased and the portion of the images with completely animated movement decreases with bigger movements, whereas the video transmission rate is reduced and the movement in the participant image data is synthesized with smaller movements.

What is claimed is:

1. A video conferencing method in which at least three participants communicate with one another by video conference participant stations of a video conference system, multimedia data being transmitted over a telecommunications network comprising at least one of participant image data and participant audio data, and each of the participants receiving the participant image data from other participants shown at a same time visually arranged on a reproduction device of the respective video conference participant station, wherein a direction of view of the participants is registered in each case by an eye tracking system, and eye tracking data comprising at least data about a direction of view are transmitted to a communications unit of the respective video conference participant station, and transmitted with full resolution and video transmission rate in each case over the telecommunications network to the communications unit of a video conference participation station are the participant image data of that participant whose participant image data are shown on the reproduction device of this last-mentioned video conference participant station in a momentary direction of view of the participant of this video conference participant station, while the participant image data of the remaining participants are transmitted in at least one of reduced resolution and reduced video transmission rate.

2. The method according to claim 1, wherein the video transmission rate is zero for participant image data that are not shown in the momentary direction of view of the participant.

3. The method according to claim 1, wherein the eye tracking data and the participant image data are transmitted to a central unit, the central unit determining, according to indications of the eye tracking data of the respective participant, the at least one of the resolution and video transmission rate of the participant image data of the other participants and transmitting the participant image data in the resolution and the video transmission rate to the communications unit of the respective participant.

4. The method according to claim 1, wherein the participant image data are transmitted to a central unit and are stored in a data store of the central unit, wherein, depending upon indications of the eye tracking data of the respective participant, the communications unit of a participant determines the at least one of the resolution and video transmission rate of the participant image data of the other participants, and these participant image data are transmitted by the central unit in the resolution and video transmission rate to the communications unit of the respective participant.

5. The method according to claim 1, wherein the participant image data for a participant are stored in a data store of the communications unit of this participant, and the communications unit determines, according to indications of the eye tracking data of this participant, the at least one of the resolution and video transmission rate of the participant image data of the other participants, the last-mentioned participant image data being transmitted in the resolution and video transmission rate to the communications unit of the respective participant by the communications units of the other participants.

6. The method according to claim 1, wherein at least one video conference participant is connected to the telecommunications network by a mobile radio network.

7. The method according to claim 1, wherein the communications unit uses picture analysis and form reconstruction algorithms to portray the participant image data that have been transmitted with reduced resolution.

8. A video conference system comprising at least three different video conference participant stations, which are connected to one another by a telecommunications network, the video conference participant stations comprising a communications unit, a reproduction device for simultaneous visible presentation of the participant image data, and a sound emitting module for reproduction of participant audio data and an image data capturing module for capturing participant image data and an audio data capturing module for capturing participant audio data, wherein the video conference participant stations comprise an eye tracking system, by which a direction of view of the respective participant is registered, and by which eye tracking system eye tracking data are transmitted to the communications unit, the eye tracking data comprising at least data on a direction of view of the participant, and the video conference system comprises means that transmit over the telecommunications network to the communications unit of a video conference participation station with full resolution and video transmission rate in each case the participant image data of that participant whose participant image data are shown on the reproduction device of this last-mentioned video conference participant station in a momentary direction of view of the participant of this video conference participant station, and which transmit the participant image data of other participants in at least one of reduced resolution and reduced video transmission rate.

9. The system according to claim 8, wherein the video transmission rate is zero for participant image data that are not shown in the momentary direction of view of the participant.

10. The system according to claim 8, wherein the video conference system comprises a central unit, which central unit determines for each participant according to indications of the eye tracking data of the respective participant at least one of the resolution and video transmission rate of the participant image data of the other participants, and transmits the participant image data in the at least one of the resolution and video transmission rate to the communications unit of the respective participant.

11. The system according to claim 8, wherein the video conference system comprises a central unit with a data store from which data store the participant image data of the participants are downloadable by the communications units according to indications of the eye tracking data of the respective participant in full or reduced resolution as well as at full or reduced video transmission rate.

12. The system according to claim 8, wherein the communications unit of a participant comprises a data store from which data store the participant image data of the respective participant are downloadable by the communications units according to the indications of the eye tracking data of the respective participant in full or reduced resolution and at full or reduced video transmission rate.

13. The system according to claim 8, wherein the telecommunications network comprises a mobile radio network.

14. The system according to claim 8, wherein the communications unit comprises a picture reconstruction module that uses picture analysis and form reconstruction algorithms to reconstruct the participant image data that have been transmitted with reduced resolution.

* * * * *